E. BREUER.
PNEUMATIC TIRE.
APPLICATION FILED JULY 9, 1913.

1,396,697.

Patented Nov. 8, 1921.
2 SHEETS—SHEET 1.

Witnesses.

Inventor.
E. Breuer.
Per, Edgar S. Brettell
Attorney.

E. BREUER.
PNEUMATIC TIRE.
APPLICATION FILED JULY 9, 1913.

1,396,697.

Patented Nov. 8, 1921.

UNITED STATES PATENT OFFICE.

EDUARD BREUER, OF PILSEN, AUSTRIA.

PNEUMATIC TIRE.

1,396,697. Specification of Letters Patent. Patented Nov. 8, 1921.

Application filed July 9, 1913. Serial No. 778,086.

(GRANTED UNDER THE PROVISIONS OF THE ACT OF MARCH 3, 1921, 41 STAT. L., 1313.)

*To all whom it may concern:*

Be it known that I, EDUARD BREUER, a subject of the Emperor of Austria, residing at Pilsen, in Austria, have invented certain new and useful Improvements in Pneumatic Tires, (for which I have filed applications in Austria, July 14, 1912, Patent No. 58,616, and in Germany, Nov. 29, 1912,) of which the following is a specification.

The facility with which a pneumatic tire absorbs obstructions increases with the suppleness of its walls and the absence of strain in said walls, and is to some extent inversely proportional to the internal pressure of the tire. These qualities of suppleness, absence of strain and low internal pressure are also important in reducing the amount of driving power required, and the heating of the tire.

The walls or envelops of tires for large loads are in some cases made of leather, in others of layers of textile fabric or thread. To prevent friction between superposed layers of fabric, when the tire is distorted by the action of the load or by passing over obstructions, the layers must be separated by elastic layers of rubber, and to protect them from damp another layer of rubber of considerable thickness is required. The modulus of elasticity of the walls in regard to tension is considerably greater than that in regard to compression, so that the neutral layer lies near the outer circumference, the outer layers are overstrained, by greater deformations, and the inner layers subjected to destructive friction. A large amount of rubber is required for the several layers of that material.

I obviate these disadvantages, and provide a pneumatic tire which can be used even for the largest loads, by means of an arrangement which relieves the walls of internal pressure, and by making the tire of such width that even small distortion results in a comparatively large bearing surface being formed.

To this end I arrange inside the air container or tube flexible connecting members, which I will call ties, attached at one end to the tread portion of the tire, and at the other end to another part of the tire. These ties normally maintain the tread surface in cylindrical shape, and take the internal pressure acting on the tread, but do not in the least interfere with distortion of the tread by external pressure or with the resumption of the normal shape of the tread when external distorting pressure is removed. I preferably distribute the points of attachment of these ties uniformly about the whole circumference of the tire, and I may attach the ties either directly to the tube wall lying on the felly, or may effect that attachment by means of intermediate members. The internal pressure acting on the tread portion and on the felly wall is thus in part balanced, but as the aggregate pressure on the tread is greater, by reason of the larger circumference of the tread, longitudinal stresses are set up in the felly wall, and wires or the like may be inserted in this wall to take these stresses.

In those cases in which pneumatic tires have heretofore been divided into separate air-tight compartments by transverse walls, these walls have by reason of their slight strength, been incapable of resisting the internal pressure in the tire, and in other cases, where the walls have been connected by horizontally arranged textile fabric, the latter has only taken the pressure directed against the side walls. Ties attached to the tread portion of the tire have not heretofore been used.

The ties which I use enable the tread to be formed with a cylindrical surface, that is to say a surface which is flat in the direction across the tire, and of such width that it can bear loads for which solid rubber tires have heretofore been required, and this effect has not heretofore been obtained, without the ties inside the tire.

In practice I prefer to form the tire of a woven tube consisting of two pieces of fabric joined at their edges by weft threads common to both, and also connected, over their entire length and width, by pole or pile threads, as in the case of weaving double velvet. This tube is made air-tight by impregnation, and though made with thin walls is capable of withstanding an internal pressure which is only limited by the strength and density of the pole threads.

If the thickness of the tire is considerable I may use an additional intermediate layer or layers of fabric, between the tread and the felly, all the layers being joined at the edges by weft threads, and connected to each other across their width by pole threads. In this case the side walls of the tire are also connected by ties, viz, by the horizontal threads of the intermediate piece or pieces of fabric, and such an air tight tube has not been known up to this time.

The members used for taking the longitudinal stresses in the wall on the felly are preferably woven into this wall so that they do not project and cut through the impregnating mass. This arrangement of longitudinal ties, such as wires, on the wall lying on the felly is novel in connection with pneumatic tires, though it has been used in connection with solid rubber tires. The use of such longitudinal, non-extensible members forming a ring affords a convenient means of attaching the tire to the wheel by friction. Either the tire is pressed on to the wheel, or part of the felly is pressed by convenient means against the wall of the tire. The thin, flexible outer wall of the tire is not, however, capable of withstanding the stresses due to driving, steering and braking the vehicle. These stresses must be taken exclusively by the outer cover, which also affords external protection. A leather cover may be used for this purpose, and may, by reason of the comparative smallness of the stresses to which it is exposed be so thin as to remain quite flexible.

The invention is illustrated in the accompanying drawing in which—

Figure 1:
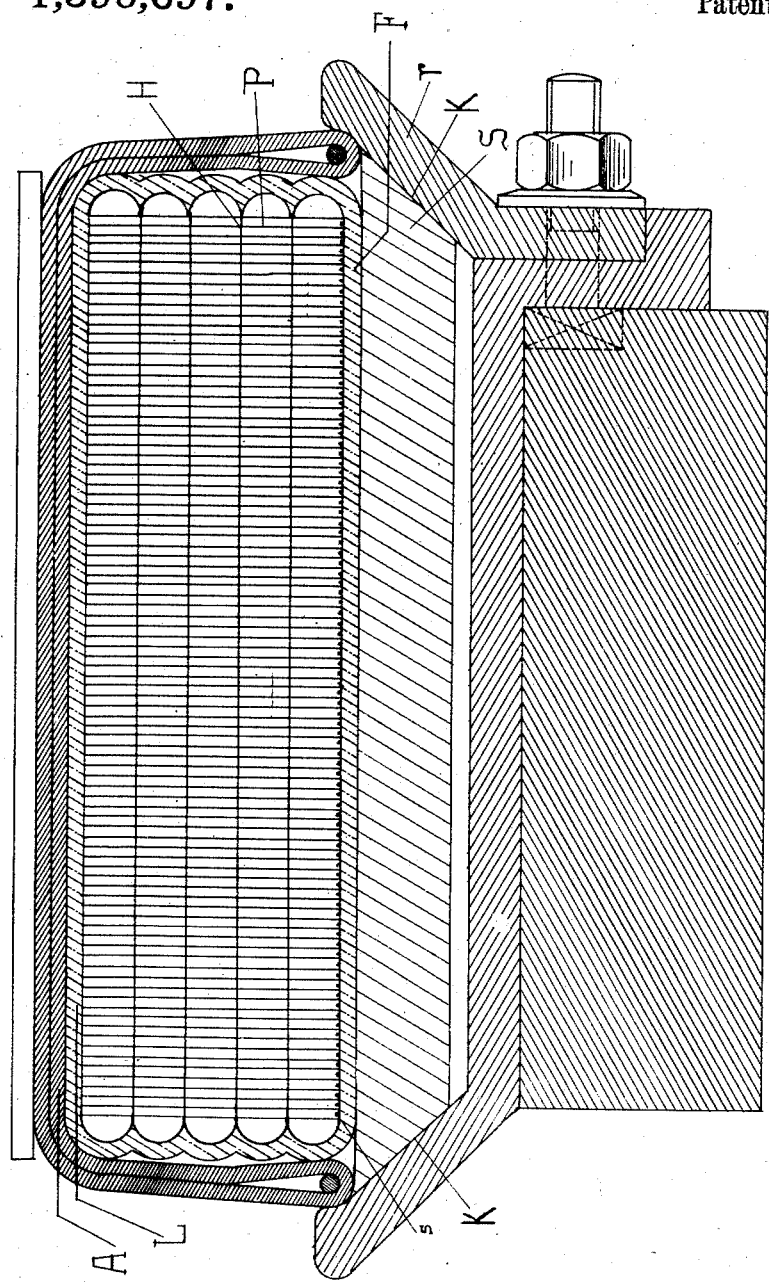
Figure 1 is a cross-section of one embodiment thereof showing the tire on the felly.

In Fig. 1, L designates the outer or tread wall of the air tube, and F the inner wall, these walls being of woven fabric, as are also the intermediate horizontal walls or partitions H, and all the the said walls are joined to each other by pole threads P, the ties hereinbefore referred to. The external walls are made air-tight by impregnation, and the walls and threads inside the tube may also be impregnated with rubber or with a glycerin composition or the like, which does not destroy their suppleness and increases their durability. In the wall F there are wires $s$, taking the longitudinal stresses.

The tube is seated on a transversely split expansible ring S, beveled at the sides to fit against oblique surfaces K of the wheel rim and of a lateral ring $r$ bolted to the rim. By bolting on the ring $r$ the ring $s$ is expanded against the air tube, which it grips. The air tube has a leather cover A, which is also held by bolting on the ring $r$. The cover may, however, also be attached by other means, for example by vulcanizing it to the tread surface.

Figure 2:
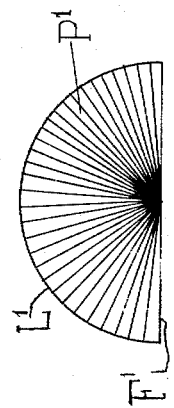

In the modification shown in Fig. 2 the tube is semicircular or fan-shaped in cross-section, consisting of walls $F^1$ and $L^1$ joined by radial pole threads $P^1$. In the modification shown in Fig. 3, the tube is in cross-section approximately similar to that shown in Fig. 1, but has only two external horizontal walls $F^2$, $L^2$, joined by pole threads $P^2$.

Figure 4:
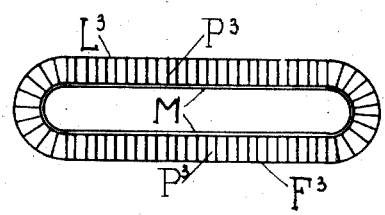

In the modification shown in Fig. 4 the walls $F^2$ and $L^3$ of the tire are joined to each other by ties $P^3$ attached to a flexible intermediate member M within the tube.

Figure 3:
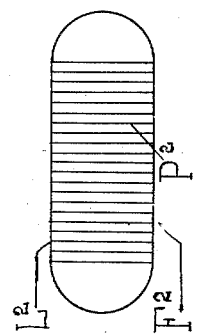
Figs. 2 to 5 are diagrams of four modifications of the air tube.
Figure 5:
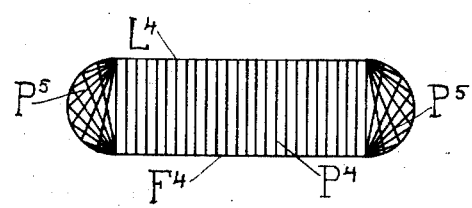

In the modification shown in Fig. 5 the tube, with its walls $F^4$ and $L^4$ joined by pole threads $P^4$, is similar to that shown in Fig. 3, but, the said walls are joined to the side walls by threads $P^5$.

The fabrics shown in Figs. 3 to 5 cannot well be described as double pile fabrics. They may be produced by means of circular knitting machines or braiding machines.

Figure 6:
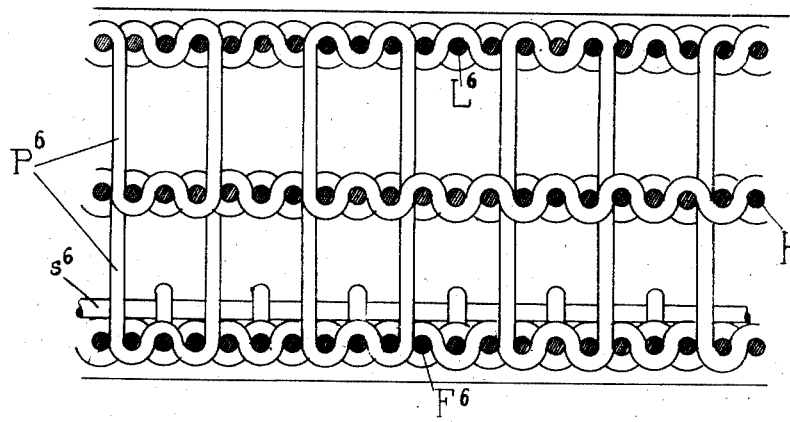
Fig. 6 is a longitudinal section showing part of an air tube in detail.
Figure 7:
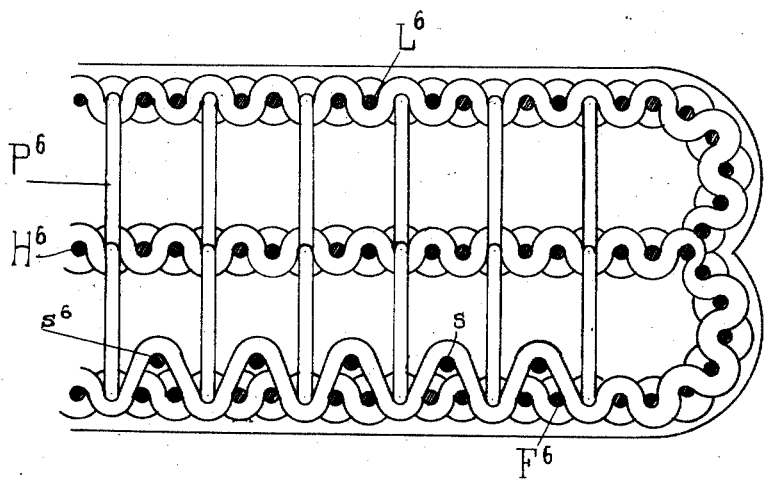
Fig. 7 is a cross-section thereof partly broken away.

Figs. 6 and 7 show in detail the nature of the double pile fabric used in the construction shown in Fig. 1, but with only one intermediate web. In Figs. 6 and 7 $L^6$ and $F^6$ designate the walls at the outer and inner circumference, joined to the intermediate wall $H^6$ by pole threads $P^6$. Steel wires $s^6$ are held by weft threads to the wall $F^6$.

What I claim as my invention and desire to secure by Letters Patent of the United States is:—

1. Pneumatic tire, comprising an annular tubular member, flexible pressure-receiving ties inside said tubular member connecting the outer circumferential wall thereof with the inner circumferential wall, in combination with members extending in the direction of the circumference of said tubular member, attached to said inner wall, for taking longitudinal stresses in said wall.

2. An air-container for pneumatic tires comprising a tubular member having a tread wall formed of textile fabric, and flexible ties inside said tubular member connected by textile fabric with the tread wall and connecting the same with portions of the inner surface of said tubular member.

3. An air-container for pneumatic tires comprising an annular tubular member, a flexible member of mesh material within same, extending in the direction of the circumference thereof, and flexible-tension ties connecting said flexible members with the outer and inner circumferential walls of said annular member.

4. An air-container comprising an annular hollow member, flexible tension-receiving ties in said member connecting the outer circumferential wall thereof with the inner circumferential wall and taking up the internal pressure, in combination with flexible ties of mesh material in said hollow member connecting the side walls thereof with each other.

5. An air-container for pneumatic tubes comprising a tubular member of fabric rendered air-tight by impregnation, and crape threads inside said tubular member connecting the outer circumferential wall thereof with the inner circumferential wall.

6. An air-container for pneumatic tires comprising a tubular member of fabric rendered air-tight by impregnation, a layer of fabric inside said tubular member, extending in the direction of the circumference thereof and woven together with said tubular member, and crape threads connecting the outer and inner circumferential walls of said tubular member with said layers of fabric.

7. A pneumatic tire comprising an annular tubular member, a flexible mesh tension-receiving means arranged within said member for taking up internal pressure thereon, said tension-receiving means comprising outer and inner circumferential walls, and flexible members connecting said walls.

8. A pneumatic tire comprising an annular tubular member, a tension-receiving member comprising outer and inner circumferential walls formed of flexible textile material arranged within said member, side walls of flexible textile material connecting said circumferential walls, a plurality of flexible ties connecting said circumferential walls, and a plurality of flexible ties connecting said side walls.

In witness whereof I have signed this specification in the presence of two witnesses.

Ing. EDUARD BREUER.

Witnesses:
RICHARD KOMINIK,
AUGUST FUGGER.